(12) United States Patent
Sato et al.

(10) Patent No.: US 10,700,448 B2
(45) Date of Patent: Jun. 30, 2020

(54) HOLDING STRUCTURE WITH INSULATION CAP AND INSULATION CAP

(71) Applicant: Yazaki Corporation, Tokyo (JP)

(72) Inventors: Kunihiko Sato, Shizuoka (JP); Kenichi Doushita, Shizuoka (JP); Aiko Okamoto, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/458,790

(22) Filed: Jul. 1, 2019

(65) Prior Publication Data
US 2020/0014131 A1    Jan. 9, 2020

(30) Foreign Application Priority Data

Jul. 4, 2018   (JP) ................ 2018-127625

(51) Int. Cl.
*H01R 4/22* (2006.01)
*H01B 7/00* (2006.01)

(52) U.S. Cl.
CPC ............. *H01R 4/22* (2013.01); *H01B 7/0045* (2013.01)

(58) Field of Classification Search
CPC ...... H01R 4/22; H01B 7/0045; H02G 15/043; H02G 3/0468
USPC ............................................. 174/74 A
See application file for complete search history.

(56) References Cited

U.S. PATENT DOCUMENTS

| | | | |
|---|---|---|---|
| 2009/0211809 A1* | 8/2009 | Daitou ............... | H02G 15/043 174/77 R |
| 2016/0180989 A1* | 6/2016 | Nakai ................. | H02G 3/0418 174/72 A |
| 2016/0190782 A1* | 6/2016 | Tsukamoto ......... | H02G 3/0468 174/72 A |
| 2016/0284440 A1* | 9/2016 | Adachi ............... | H02G 3/0691 |
| 2017/0001580 A1* | 1/2017 | Hagi ................... | B60R 16/0215 |
| 2018/0138676 A1* | 5/2018 | Yabashi ............. | B60R 16/0215 |

FOREIGN PATENT DOCUMENTS

JP        09-205719 A     8/1997

\* cited by examiner

*Primary Examiner* — Sherman Ng
(74) *Attorney, Agent, or Firm* — Sughrue Mion, PLLC

(57) ABSTRACT

A holding structure with an insulation cap includes a corrugated tube which sheathes a trunk included in a wire harness and which has an outer circumference provided with a recess and a protrusion alternately arranged in a longitudinal direction. The insulation cap is attached to an end of a branch included in the wire harness and is provided with a protrusion which fits in the recess of the corrugated tube. The protrusion of the insulation cap is engaged with the recess of the corrugated tube, and a tape is wound around the insulation cap and the corrugated tube.

5 Claims, 4 Drawing Sheets

HOLDING STRUCTURE WITH INSULATION CAP AND INSULATION CAP

BACKGROUND

Technical Field

The present disclosure relates to a holding structure with an insulation cap that uses an insulation cap to insulate an end of a cable of a wire harness, and relates to an insulation cap used for the holding structure.

Related Art

Japanese laid-open patent application No. JP H09-205719 discloses a holding structure with an insulation cap in the related art. In this holding structure with an insulation cap, a wire harness has a branch branched from a trunk. An end of the branch is spliced by welding or the like. The insulation cap is attached to the spliced end. The insulation cap has a cylindrical portion with the front closed and a tongue portion protruding from the rear end of the cylindrical portion. The end of the branch is housed in the cylindrical portion. The tongue portion and the branch are bound with a tape.

The insulation cap attached to the end of the branch is arranged along the outer circumference of the trunk of the wire harness. The trunk and the insulation cap are bound with a tape.

In this manner, in the holding structure with an insulation cap in the related art, the insulation cap is used to insulate the branch having the end spliced.

SUMMARY

However, in the holding structure with an insulation cap in the related art, when an external force in a direction in which the branch is drawn from the insulation cap acts on the branch, all of the external force acts on the tape that binds the trunk and the insulation cap together. This action causes problems such as peeling or a cut of a tape.

The present disclosure has been made to solve the problems. An object of the present disclosure is to provide a holding structure with an insulation cap which has a strong holding force and does not cause problems such as peeling or a cut of a tape, and to provide an insulation cap.

In order to achieve the object, an aspect of the present disclosure provides a holding structure with an insulation cap, the holding structure including: an exterior member which sheathes a first cable included in a wire harness and which has an outer circumference provided with a recess and a protrusion alternately arranged in a longitudinal direction; and an insulation cap which is attached to an end of a second cable included in the wire harness and which has an outer circumference provided with an engagement unit that fits at least in one of the recess and the protrusion, wherein the engagement unit of the insulation cap is engaged with at least any one of the recess and the protrusion of the exterior member, and the insulation cap and the exterior member are bound with a tape.

According to the arrangement, when an external force acts on the second cable in a direction in which the second cable is drawn from the insulation cap, the external force is received by an engagement structure including the engagement unit of the insulation cap and at least one of the recess and the protrusion of the exterior member. Accordingly, a small external force acts on the tape that fastens the trunk and the insulation cap. Therefore, the insulation cap has a holding force strong enough not to cause problems such as peeling or a cut of the tape.

DETAILED DESCRIPTION OF EMBODIMENT

An embodiment of the present disclosure will hereinafter be described with consultation of drawings.

Figure 1:
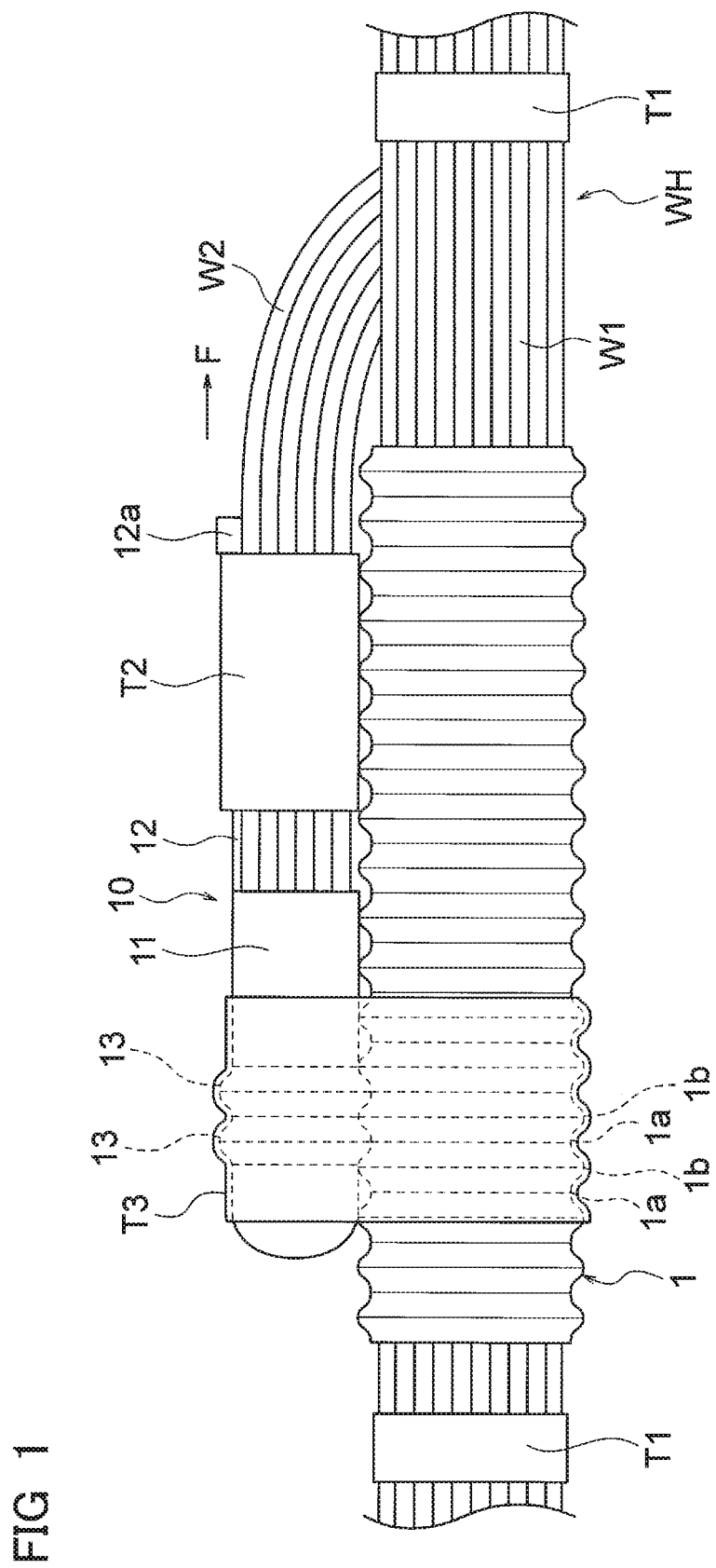
FIG. 1 is a side view illustrating a holding structure with an insulation cap according to an embodiment of the present disclosure.
Figure 2:
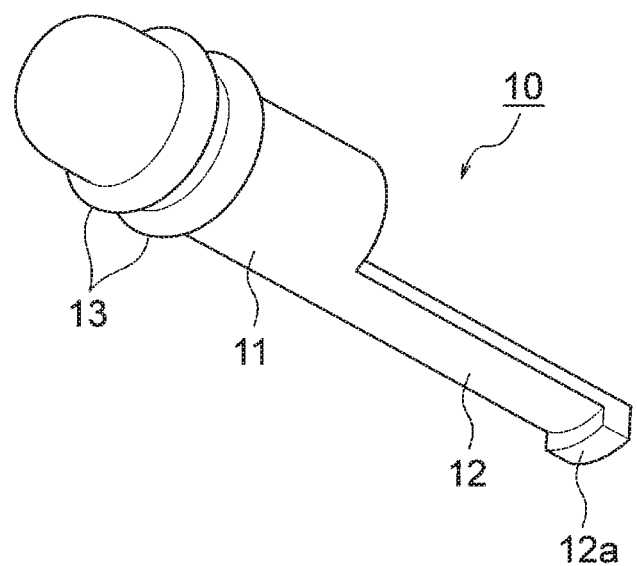
FIG. 2 is a perspective view illustrating an insulation cap according to an embodiment of the present disclosure.
Figure 3A:
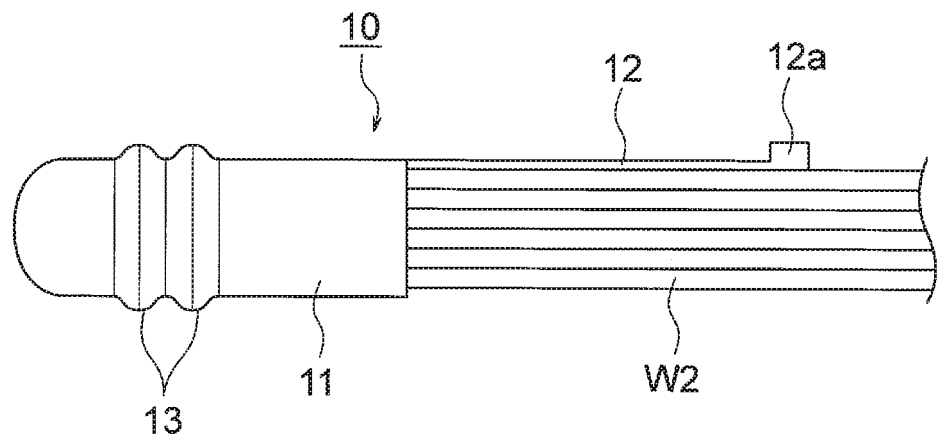
FIG. 3A is a side view of the insulation cap according to an embodiment of the present disclosure being attached to an end of a branch.
Figure 3B:
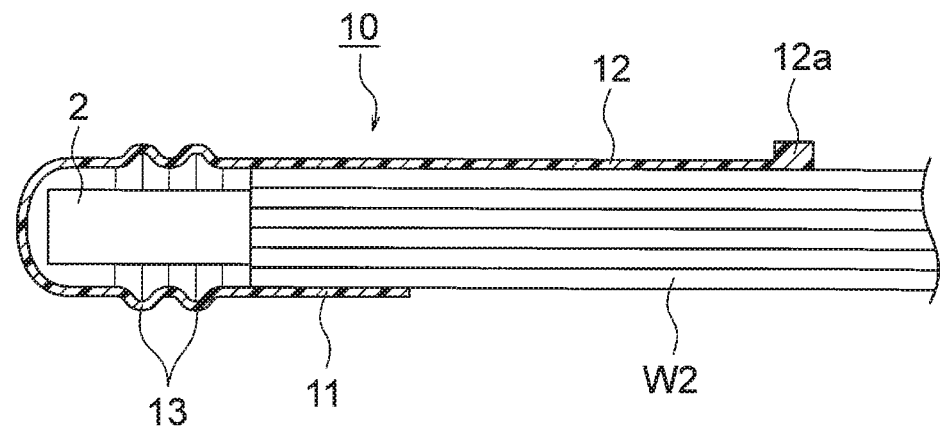
FIG. 3B is a cross-sectional view of the insulation cap being attached to the end of the branch.

FIGS. 1 to 4 illustrate an embodiment of the present disclosure. As illustrated in FIG. 1, a wire harness WH includes a trunk W1, or a first cable, and a branch W2, or a second cable, which is branched from the trunk W1. An end of the branch W2 is held insulated by a holding structure including an insulation cap 10. Hereinafter, a holding structure with an insulation cap will be described.

The trunk W1 of the wire harness WH includes a plurality of cables. The plurality of cables is bound with a tape T1 at an interval in the longitudinal direction. A corrugated tube 1, or an exterior member, is attached to the outer circumference of the trunk W1. The corrugated tube 1 is provided with recesses 1a and protrusions 1b alternately arranged over the entire length of the outer circumference in the longitudinal direction. Accordingly, the corrugated tube 1 is excellent in flexibility and enables cable routing of the trunk W1 along a curved or bent routing path.

An end 2 of the branch W2 of the wire harness WH is spliced by, for example, hot welding. The insulation cap 10 is attached to the spliced end 2.

The insulation cap 10 includes an insulating member. As illustrated in detail in FIGS. 2 and 3, the insulation cap 10 includes a cylindrical portion 11 with the front closed and a tongue portion 12 protruding from the rear end of the cylindrical portion 11. The end 2 of the branch W2 is housed in the cylindrical portion 11. The outer circumference of the cylindrical portion 11 is provided with a plurality of protrusions 13 or engagement units at an interval in the longitudinal direction. The protrusions 13 fit in the recesses 1a on the outer circumference of the corrugated tube 1. An interval between the protrusions 13 is equal to an interval between the recesses 1a of the corrugated tube 1. Each protrusion 13 is arranged over the entire of the outer circumference of the cylindrical portion 11. In other words, each protrusion 13 is arranged in a ring shape on the outer circumference of the cylindrical portion 11.

The tongue portion 12 is extended toward the rear side of the cylindrical portion 11. The tongue portion 12 is an arcuate plate that corresponds to the arc shape of the cylindrical portion 11. The rear end of the tongue portion 12 is provided with a protruding wall 12a that protrudes outward from the outer circumference of the tongue portion 12.

A portion of the branch W2 exposed outside from the cylindrical portion 11 and the tongue portion 12 are bound with a tape T2. Accordingly, the insulation cap 10 is fixed to the branch W2. The tape T2 is not easily removed due to the protruding wall 12a.

Figure 4:
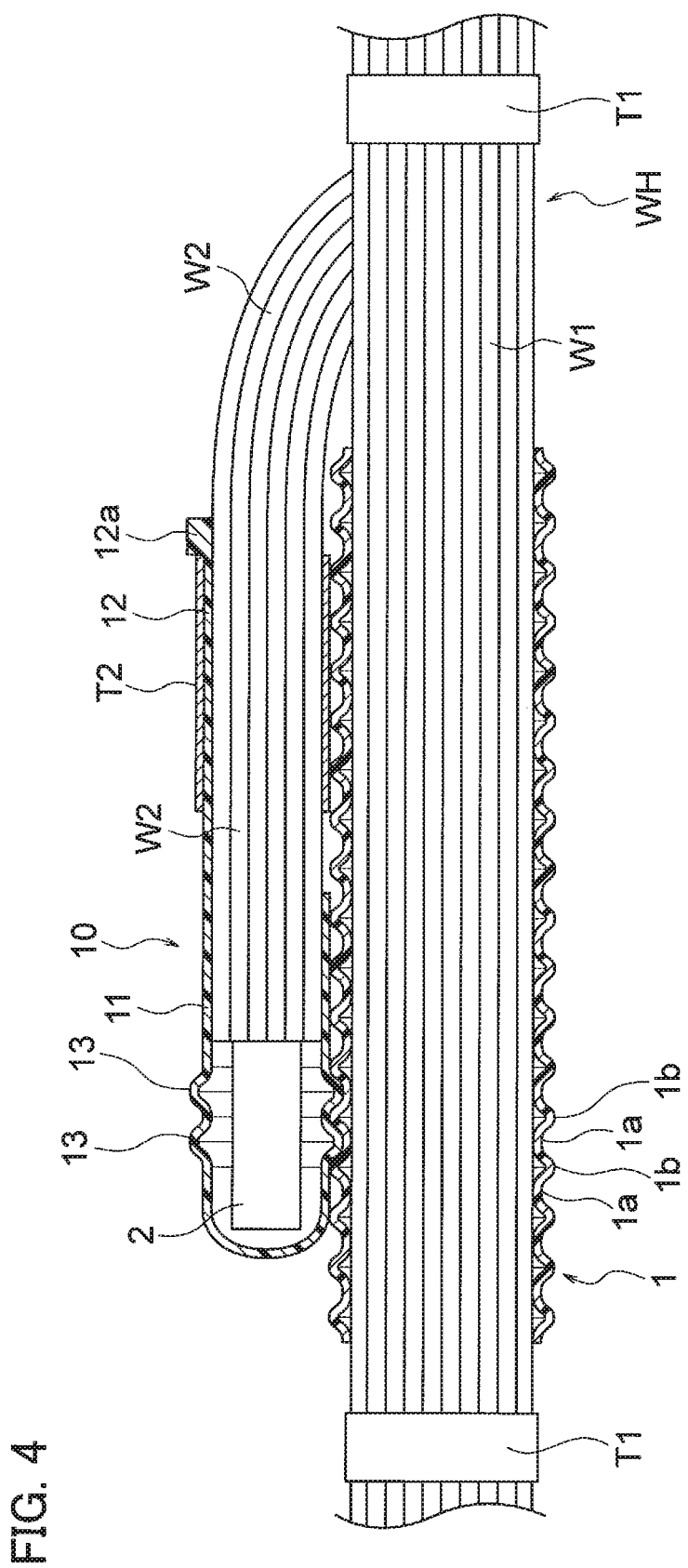
FIG. 4 is a cross-sectional view illustrating that the insulation cap according to an embodiment of the present disclosure which is attached to the end of the branch is arranged on the outer circumference of a corrugated tube.

As illustrated to FIG. 1 and FIG. 4, the insulation cap 10 is arranged along the outer circumference of the trunk W1 of the wire harness WH. In detail, while the protrusions 13 of the insulation cap 10 are engaged with the recesses 1a of the corrugated tube 1, the insulation cap 10 and the corrugated tube 1 are bound with a tape T3. In other words, the insulation cap 10 is fixed to the trunk W1 while the tape T3 keeps the protrusions 13 of the insulation cap 10 engaged with the recesses 1a of the corrugated tube 1.

Hereinafter, the assembly of the holding structure with an insulation cap will be described. The end 2 of the spliced branch W2 is inserted into the cylindrical portion 11 of the insulation cap 10. The tongue portion 12 of the insulation cap 10 and the branch W2 are bound and fixed with the tape T2. Next, as illustrated in FIG. 4, the protrusions 13 on the outer circumference of the insulation cap 10 are engaged with the recesses 1a of the corrugated tube 1, and the insulation cap 10 is arranged along the outer circumference of the corrugated tube 1. The insulation cap 10 and the corrugated tube 1 are then bound and fixed with the tape T3 (see FIG. 1). Accordingly, the assembly is complete.

As described above, the holding structure with an insulation cap is provided with the corrugated tube 1 which sheathes the trunk W1 included in the wire harness WH and provided with the insulation cap 10 which is attached to the end 2 of the branch W2 included in the wire harness WH. The corrugated tube 1 has the outer circumference provided with the recesses 1a and the protrusions 1b alternately arranged in the longitudinal direction. The insulation cap 10 has the outer circumference provided with the protrusions 13 that fit in the recesses 1a. The protrusions 13 of the insulation cap 10 are engaged with the recesses 1a of the corrugated tube 1, and the tape T3 is wound around the insulation cap 10 and the corrugated tube 1.

In this structure, when an external force F acts on the branch W2 in a direction in which the branch W2 is drawn from the insulation cap 10, the external force F is also received by an engagement structure including the protrusions 13 of the insulation cap 10 and the recesses 1a of the corrugated tube 1. Accordingly, the external force F partially acts on the tape T3 that binds the trunk W1 and the insulation cap 10 together. Therefore, the insulation cap 10 has a holding force strong enough not to cause problems such as peeling or a cut of the tape.

The protrusions 13 of the insulation cap 10 are arranged at two places in a direction in which the branch W2 is inserted into the insulation cap 10. Accordingly, the external force F is dispersedly received by the two protrusions 13. This arrangement strengthens the holding force of the insulation cap 10 and reliably prevents the tape from being peeled off or cut as compared with a case where the insulation cap 10 is provided with one protrusion 13.

The protrusions 13 of the insulation cap 10 are arranged over the entire circumference of the insulation cap 10. This arrangement enables the protrusions 13 to be fitted to the recesses 1a of the corrugated tube 1 in any rotation direction on the outer circumference of the insulation cap 10, which facilitates the operation.

The number of protrusions of the insulation cap 10 herein is two. However, one protrusion or three or more protrusions may be employed. An increase in the number of protrusions of the insulation cap 10 enables dispersion of the external force F in the direction in which the branch W2 is drawn from the insulation cap 10 and strengthens the holding force of the insulation cap 10.

The engagement units of the insulation cap 10 herein are the protrusions 13 protruding from the outer circumference. According to another embodiment, the engagement units may be recesses which are recessed from the outer circumference or may be an uneven section having both a portion protruding from the outer circumference and a portion recessed therefrom.

The exterior member herein is the corrugated tube 1 having the recesses 1a and the protrusions 1b alternately arranged over the entire length of the outer circumference. According to another embodiment, the exterior member may have the recesses 1a and the protrusions 1b alternately arranged in a part of the outer circumference in the longitudinal direction, and the other part of the outer circumference may be formed flat.

What is claimed is:

1. A holding structure with an insulation cap, the holding structure comprising:
    an exterior member which sheathes a first cable included in a wire harness and which has an outer circumference provided with a recess and a protrusion alternately arranged in a longitudinal direction; and
    an insulation cap attached to an end of a second cable included in the wire harness and provided with an engagement unit that fits at least in one of the recess and the protrusion, the insulation cap comprising a cylindrical portion having a closed end to enclose the end of the second cable,
    wherein the engagement unit of the insulation cap is engaged with at least any one of the recess and the protrusion of the exterior member, and the insulation cap and the exterior member are bound with a tape.

2. The holding structure with an insulation cap according to claim 1,
    wherein the engagement unit of the insulation cap is arranged all around the insulation cap.

3. The holding structure with an insulation cap according to claim 1,
    wherein the engagement unit of the insulation cap is a protrusion that fits in the recess of the exterior member.

4. A holding structure with an insulation cap, the holding structure comprising:
    an exterior member which sheathes a first cable included in a wire harness and which has an outer circumference provided with a recess and a protrusion alternately arranged in a longitudinal direction; and
    an insulation cap attached to an end of a second cable included in the wire harness and provided with an engagement unit that fits at least in one of the recess and the protrusion,
    wherein the engagement unit of the insulation cap is engaged with at least any one of the recess and the protrusion of the exterior member, and the insulation cap and the exterior member are bound with a tape,
    wherein the engagement unit of the insulation cap is arranged at a plurality of places in a direction in which the second cable is inserted into the insulation cap.

5. An insulation cap attached to an end of a cable, the insulation cap comprising:
    an engagement unit which is arranged on an outer circumference of the insulation cap and which fits at least in one of a recess and a protrusion on an outer circumference of an exterior member, wherein the insulation cap comprising a cylindrical portion having a closed end to enclose the end of the second cable.

\* \* \* \* \*